H. G. & A. F. OSTERBERG.
CANDY COATING MACHINE.
APPLICATION FILED JULY 23, 1917.

1,270,316.

Patented June 25, 1918.
4 SHEETS—SHEET 1.

H. G. & A. F. OSTERBERG.
CANDY COATING MACHINE.
APPLICATION FILED JULY 23, 1917.
1,270,316.
Patented June 25, 1918.
4 SHEETS—SHEET 3.
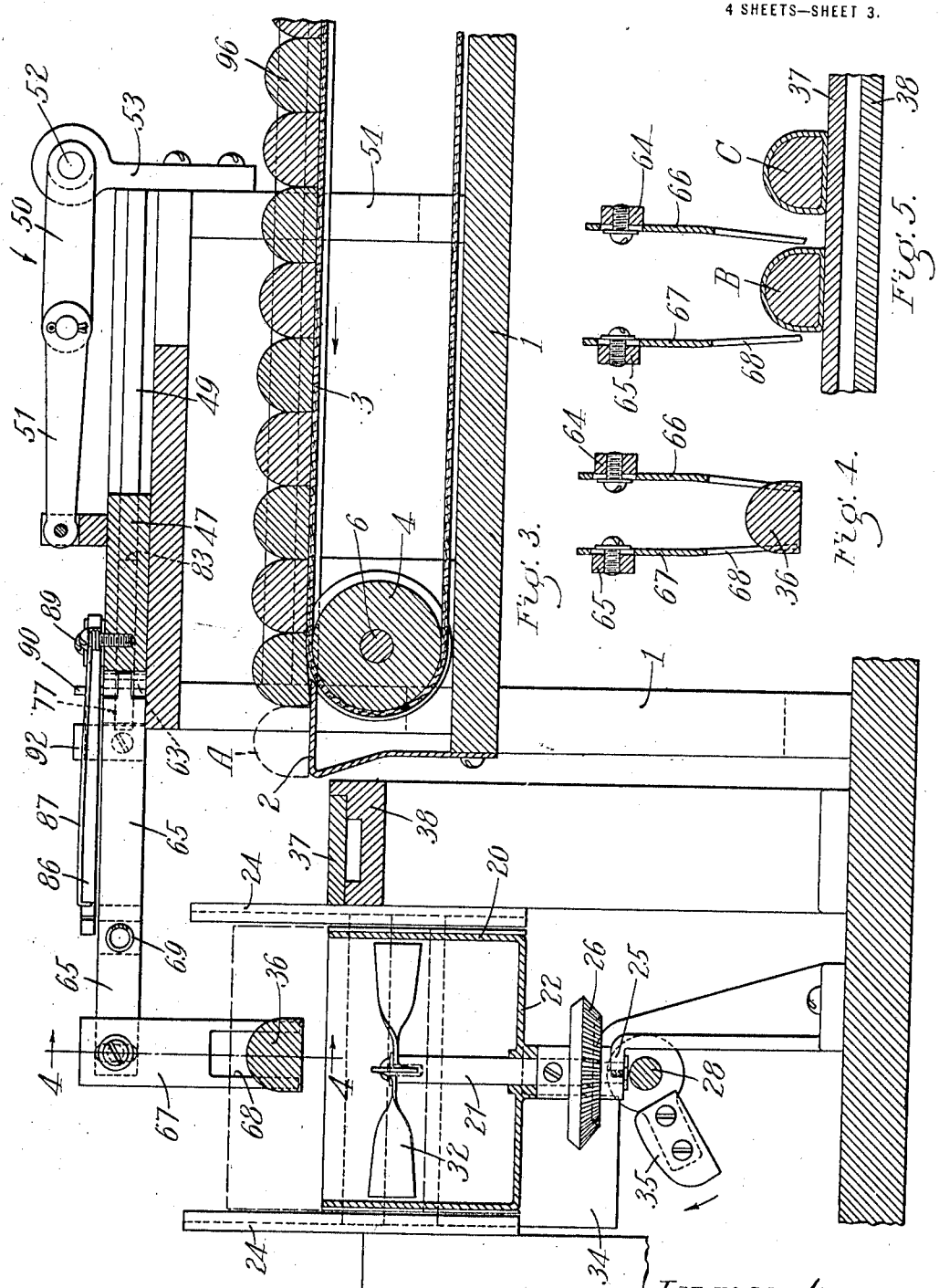

H. G. & A. F. OSTERBERG.
CANDY COATING MACHINE.
APPLICATION FILED JULY 23, 1917.
1,270,316.
Patented June 25, 1918.
4 SHEETS—SHEET 4.
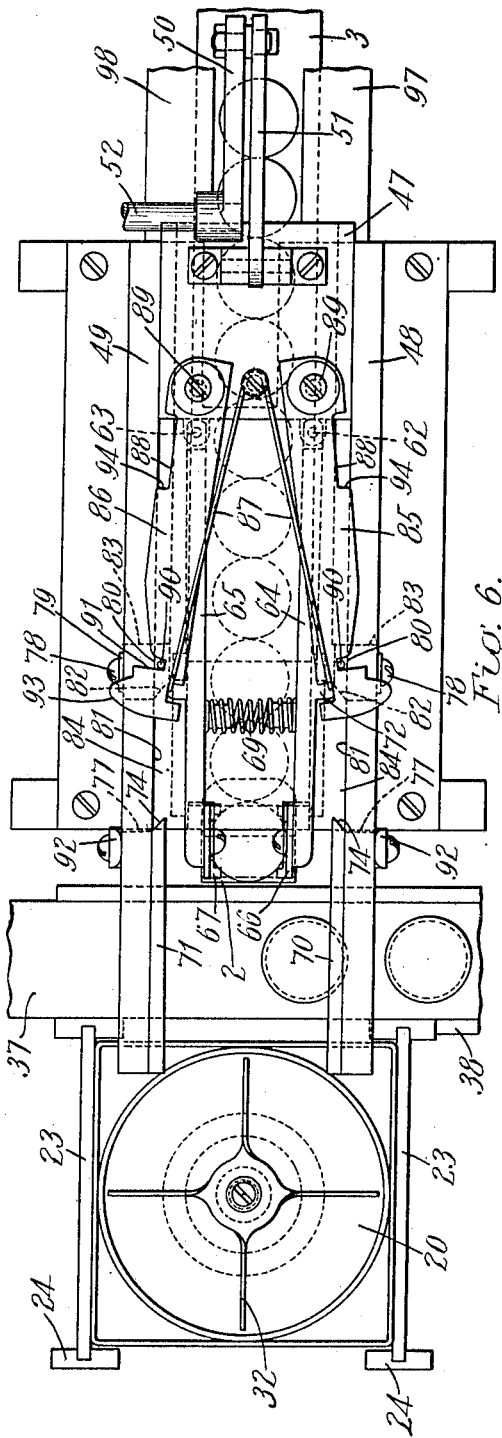
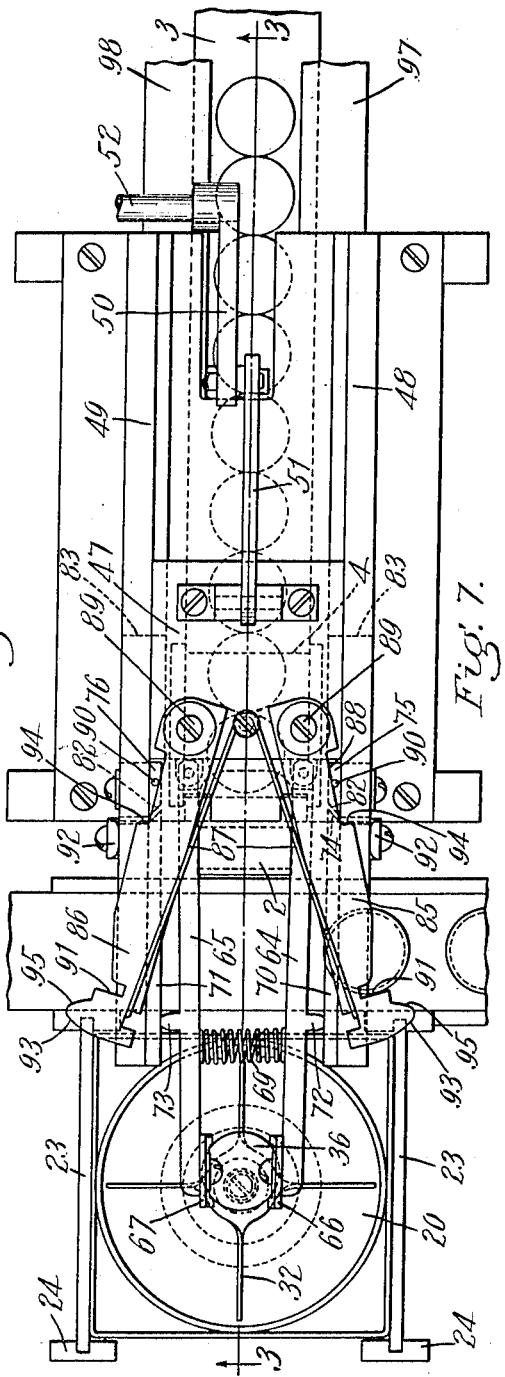

UNITED STATES PATENT OFFICE.

HENRY G. OSTERBERG, OF BRIGHTON, MASSACHUSETTS, AND AUGUST F. OSTERBERG, OF AUBURN, NEW YORK.

CANDY-COATING MACHINE.

1,270,316.   Specification of Letters Patent.   Patented June 25, 1918.

Application filed July 23, 1917. Serial No. 182,143.

*To all whom it may concern:*

Be it known that we, HENRY G. OSTERBERG, a citizen of the United States, residing at Brighton, in the county of Suffolk and State of Massachusetts, and AUGUST F. OSTERBERG, a citizen of the United States, residing at Auburn, in the county of Cayuga and State of New York, have invented new and useful Improvements in Candy-Coating Machines, of which the following is a specification.

This invention relates to machines for coating candy and the like and has for its object to provide a simple, automatic machine adapted to feed the articles, hereinafter referred to as centers, to the coating instrumentalities and afterward place the coated centers upon trays upon which they are permitted to remain until thoroughly dried.

Another object of the invention is to provide automatic gripping devices for transferring said centers from one station to another.

Still another object of the invention is to provide means for dipping or coating the centers.

The invention consists in the combination and arrangement of parts set forth in the following specification and particularly pointed out in the claims.

Referring to the drawings:

Fig. 3 is a vertical section taken on the line 3—3 of Fig. 7.

Fig. 4 is a detail section taken on the line 4—4 of Fig. 3, illustrating the grippers contracted about a center.

Fig. 5 is a detail section, similar to Fig. 4, illustrating the grippers separated with the center previously supported thereby having received its coating and deposited upon the tray.

Fig. 6 is a detail plan view of the center transferring and coating instrumentalities, the grippers being shown in the act of picking up a center in readiness to transfer it to the coating receptacle.

Fig. 7 is a plan view, similar to Fig. 6, illustrating the center transferring devices in their advanced position with a center arranged between the grippers and suspended over the coating receptacle.

Like numerals refer to like parts throughout the several views of the drawings.

Figure 1:
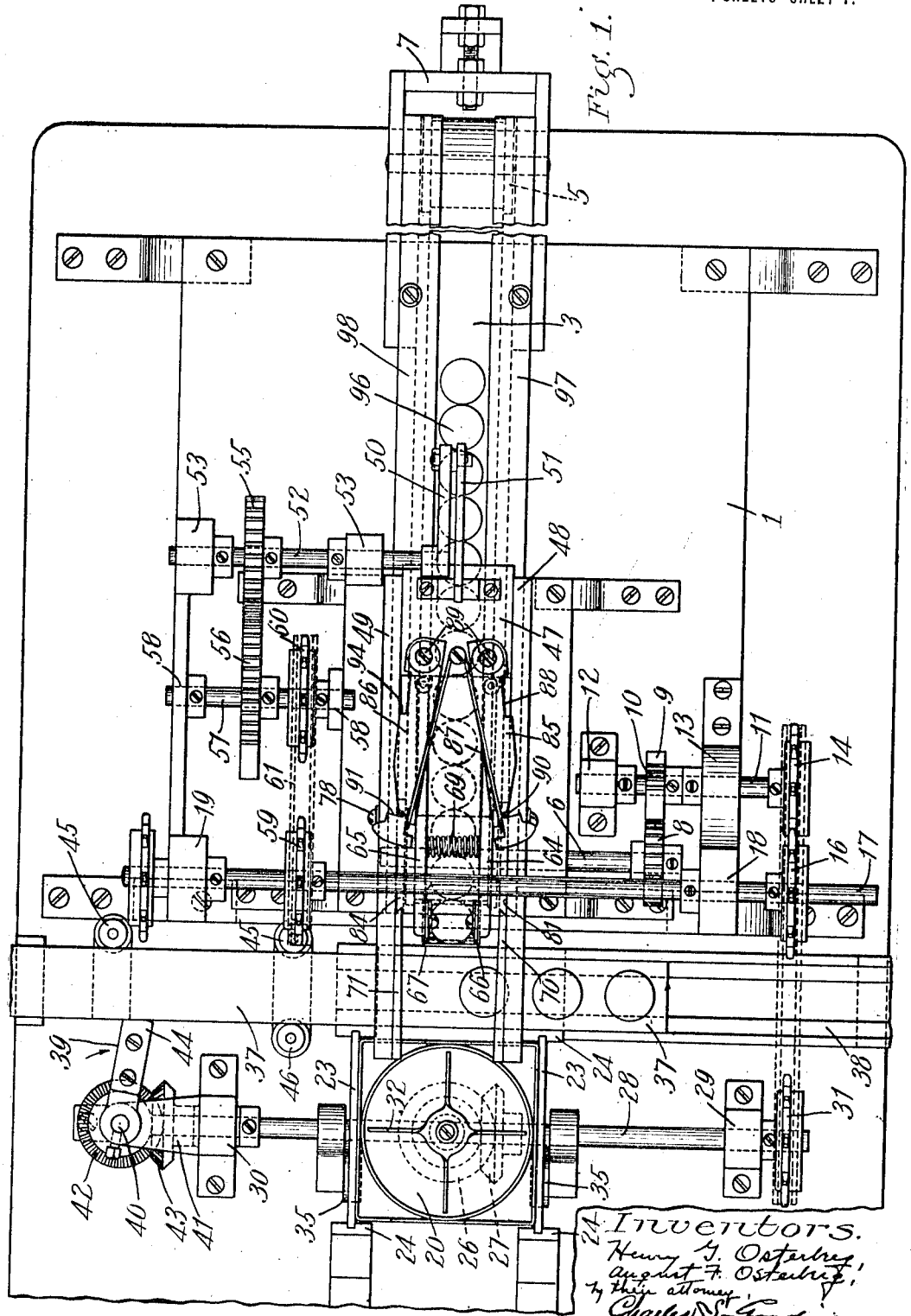
Figure 1 is a plan view of a machine embodying this invention, portions of certain unessential parts being broken away to save space in the drawings.
Figure 2:
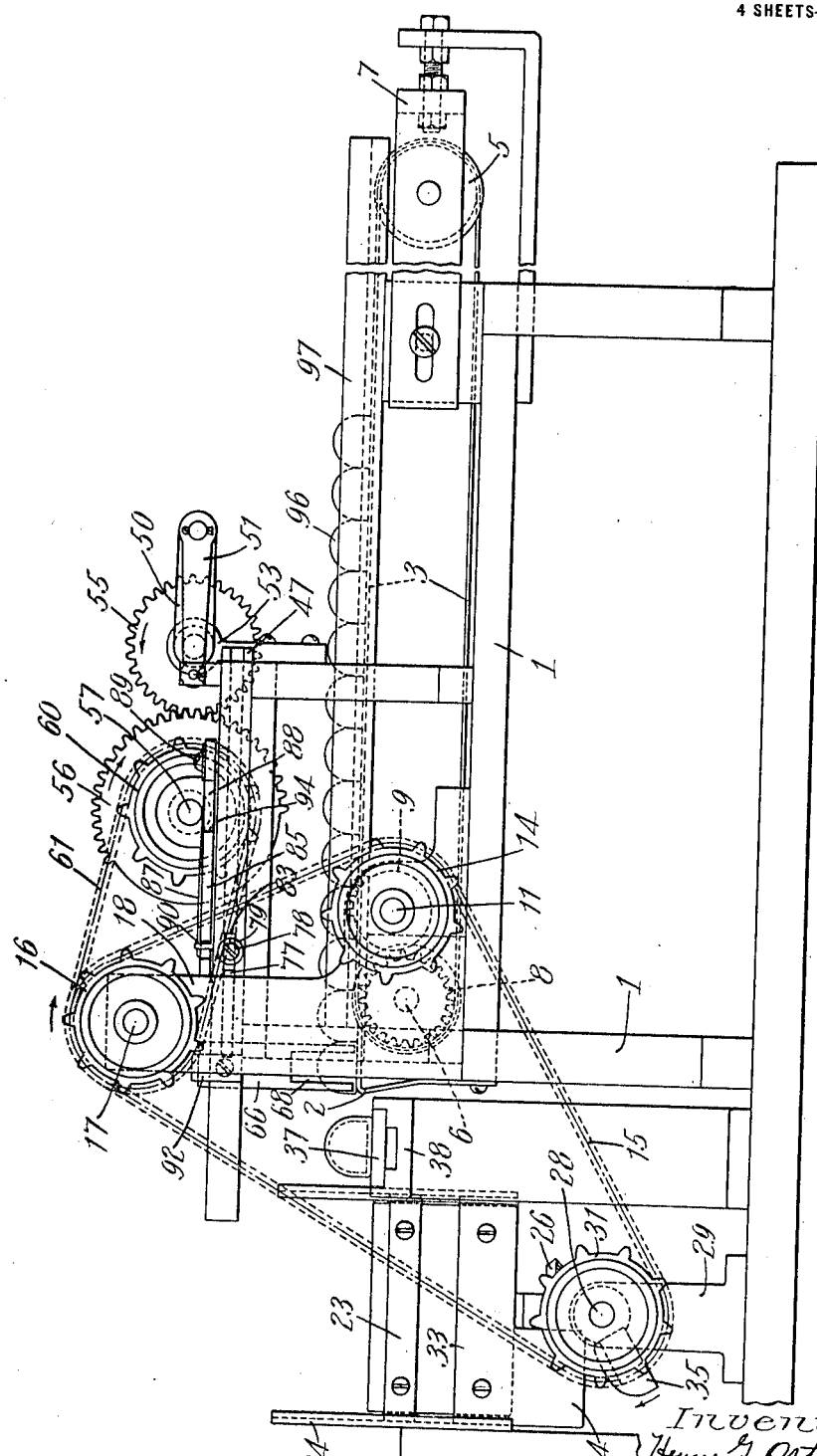
Fig. 2 is a front elevation of the machine.

In the drawings, 1 is a frame upon which is placed a shelf or support 2 which constitutes the so called receiving station for centers of the candy to be coated. Means are provided for advancing the centers one at a time to the receiving station or shelf 2, said means preferably consisting of an endless conveyer belt 3 adapted to run over pulleys 4 and 5 mounted on said frame. The pulley 4 is secured to a shaft 6 journaled to rotate adjacent to the shelf 2 in bearings attached to the frame 1, while the pulley 5 is journaled to rotate in a bracket 7 adjustably mounted at the end of the frame 1.

A gear 8 is secured to the shaft 6 and is adapted to mesh with a gear 9 from which most of the teeth have been removed, the number of teeth remaining and shown at 10 being sufficient to rotate the gear 8 and shaft 6 a distance equal to the distance between successive centers upon the endless conveyer 3, thereby imparting an intermittent movement to the conveyer belt 3 to advance the centers to the receiving station at the speed required. The gear 9 is attached to a counter shaft 11, journaled to rotate in bearings 12 and 13 supported by the frame 1.

A sprocket 14 is attached to the shaft 11 and is engaged by a chain 15 extending over a sprocket 16 secured to the driving shaft 17 of the machine, said driving shaft being journaled to rotate in bearings 18 and 19. Disposed at a distance from the shelf 2 is a receptacle 20 adapted to contain the coating liquid for the centers. This receptacle is preferably mounted slightly below the level of the shelf 2 and is slidably arranged to move upwardly from its normal position, as indicated in dotted and full lines respectively in Fig. 3.

This receptacle is guided, during the vertical movement thereof, by a shaft 21 vertically disposed in rotatable and slidable engagement with the bottom 22 of said receptacle and by plates 23, 23 arranged upon opposite sides thereof and in slidable engagement with vertical guides 24, 24, said plates 23 being mounted adjacent to the upper edge of said receptacle. The shaft 21 is journaled to rotate in a bracket 25 mounted beneath said receptacle and attached to a portion of the frame 1 and a beveled gear 26 is attached to said shaft beneath said receptacle in engagement with a beveled gear 27 secured to a horizontal shaft 28. The shaft 28 is journaled to rotate in bearings 29 and 30 and receives its motion from the driving shaft 17, preferably through the chain 15 and a sprocket 31 secured to said shaft 28.

Attached to the upper end of the shaft 21 is an agitator 32 which is rotated in the receptacle 20 by the beveled gears 26 and 27, thus constantly stirring the coating material contained within said receptacle. A second pair of plates 33 is attached to the sides of the receptacle 20 adjacent to the bottom thereof in slidable engagement with the guides 24, 24 and these plates have depending portions 34 adapted to be engaged by cams 35 secured to and rotatable with the shaft 28, said cams being adapted to engage said plates 33 and elevate the coating receptacle at a predetermined time in the operation of the machine, the weight of the receptacle being preferably utilized to move it to its normal position when the cams 35 are disengaged from the plates 33.

From the receiving station or shelf 2 the centers deposited thereon by the belt 3 are transferred, preferably one at a time, into a position over the coating receptacle 20, which position is indicated at 36 and referred to as the coating station and after said receptacle 20 has been elevated so that the liquid contained therein covers the center at the position 36 the receptacle is lowered by the mechanism hereinbefore described and the coated center is moved by the transferring means into a position over a tray 37, upon which it is finally deposited by the mechanism hereinafter described. The tray 37 is disposed preferably between the shelf 2 and the receptacle 20, the movement of the coated center in being transferred to the tray 37 being preferably along the same path traversed by said center during its transferal from the shelf 2 to the position 36.

The tray 37 is furthermore mounted upon a suitable guide 38 and adapted to be moved on said guide transversely of the path of said centers, step by step, by means of a revolving member 39 secured to a shaft 40 rotating in an arm 41 on the bearing 30. The shaft 40 is operatively connected with the shaft 28 by means of beveled gears 42 and 43. The member 39 is adapted to intermittently engage the adjacent edge of the tray 37 and advance said tray sufficient to make room for the next center to be coated.

To facilitate the movement of said tray the end of the member 39 is preferably provided with a resilient contact 44 of material such as rubber, and the pressure against the tray 37 of said member 39 is resisted by rollers 45, 45 arranged upon the opposite side of said tray and these rollers, together with a roller 46, support said tray until it arrives at the guide 38. The trays 37 may be constructed of flat strips, preferably of wood coated with wax or other suitable substance, to prevent the sticking of the candy thereto and these trays may be fed in predetermined lengths continuously along the guide 38 by the revolving member 39 to receive the coated centers as fast as they are delivered from the machine and upon these trays the coated centers may remain until the coating thereon has dried.

The mechanism hereinbefore referred to as the center transferring means preferably embodies in its construction a slide 47 arranged to move along horizontal guides 48 and 49 disposed above the endless belt 3, a reciprocating motion being imparted to said slide by means of a crank 50 connected by a link 51 to said slide, said crank being attached to a shaft 52 journaled to rotate in bearings 53, 53 upon a superstructure 54 of the frame 1. The shaft 52 has a gear 55 attached thereto which meshes with an intermittent gear 56, preferably attached to a counter-shaft 57 journaled to rotate in bearings 58 on said super-structure. The shaft 57 is rotated upon the driving shaft 17 by sprockets 59 and 60 and a chain 61 extending around said sprocket.

Pivoted at 62 and 63 on said slide is a pair of arms 64 and 65 adapted to move toward and away from each other and to the free ends of the arms 64 and 65 are attached resilient coöperating gripping fingers 66 and 67 respectively which extend downwardly therefrom to engage the centers delivered to the receiving station 2. The lower ends of the fingers 66 and 67 are slotted at 68 to render said fingers more resilient and to more securely grip the centers.

A spring 69 is mounted between the arms 64 and exerts a yielding pressure against said arms to separate the gripping fingers 66 and 67. This separating movement is, however, resisted during portions of the movements of said slide by guides 70 and 71 which engage projections 72 and 73 on the outer sides of the arms 64 and 65 respectively. The guides 70 and 71 engage the projections 72 and 73 only a portion of the travel of the slide, this portion being the latter portion which includes the positioning of the gripping fingers over the receptacle 20 and said guides are preferably tapered, that is to say, the inner surfaces thereof gradually approach each other in the direction of the receptacle 20 so as to gradually contract the gripping fingers over the center therebetween, prior to its being dipped.

The guides 70 and 71 preferably terminate, at points 74, about midway between the positions occupied by the projections 72 and 73 when the dipping operation takes place and the positions occupied by said projections when the grippers are operated to grip the center at the receiving station, and coöperating with said guides are movable cam blocks 75 and 76 which are slidably arranged in slots 77 extending transversely through the guides 48 and 49, said blocks being retained within their respective grooves by screws and washers 78 and 79.

The blocks 75 and 76 project inwardly from the guides 48 and 49 a distance substantially equal to the thickness of the ends 74 of the guides 70 and 71 and said blocks are shouldered at 80 to engage and slide along the inner faces 81 of the guides 48 and 49, said blocks being also beveled at 82 to form the cam surfaces which are adapted to be engaged by the projections 72 and 73 during the operation of the slide to contract the gripper arms. The slots 77 extend from the ends 74 of the guides 70 and 71 to points 83 at predetermined distances from said ends and the movements of said blocks are limited in one direction by said ends 83 and in the opposite direction said blocks are adapted to move substantially to the ends 74 of the guides 70 and 71. The movements of the blocks against the ends 83 of said slots take place during the initial movement of the slide 47 toward the right, see Figs. 6 and 7, and in so moving gaps 84 will be formed between the ends 74 and the beveled surfaces 82 and into these gaps the projections 72 and 73 are adapted to be moved by the spring 69 during the operation of the slide 47.

The positions of the projections 72 and 73 on their respective arms are such as to bring said projections at the ends 74 of the guides and permit said projections to drop into said gaps just as the gripping fingers arrive at the position above the tray 37, whereupon the coated center carried by said grippers will be released and permitted to drop upon said tray. The continued movement of the slide 47, Fig. 6, moves the projections 72 and 73 into engagement with the beveled faces 82 on said cam blocks, thereby causing the arms carrying said projections, together with the gripping fingers, to be contracted against the action of the spring 69 and this action takes place just as said fingers arrive adjacent to the center which is, at this time, resting upon the shelf 2, causing said grippers to engage said center.

During the initial movement of the slide 47 in the opposite direction, that is, toward the left, Figs. 6 and 7, the arms 64 and 65 are adapted to be held in their contracted positions by said blocks, being kept in contact with the projections 72 and 73 until said cam blocks arrive at the ends of the slots 77 adjacent to the end 74 of the guides 70 and 71, whereupon a further movement of said cam blocks will be prevented and the projections 72 and 73 will pass from said blocks onto the guides 70 and 71 and continue thereon to the end of the movement.

The movements of the cam blocks 75 and 76 are automatically controlled during the operation of the slide carrying the grippers, preferably by means of pivoted members 85 and 86 pivoted at 89 to opposite sides of the slide 47 and normally yieldingly separated by a spring 87. Each of the members 85 and 86 has a notch 88 formed in its outer edge near the pivots 89. Coöperating with the notches 88 are pins 90 which project upwardly from the cam blocks 75 and 76. The pivoted members 85 and 86 are also provided, in their outer edges adjacent to the free end thereof, with notches 91 also adapted to coöperate with the pins 90.

The pivoted members 85 and 86 are forced apart by the spring 87 so that the pins 90 will enter the recesses 91 just as the projections 72 and 73 are engaging the beveled faces 82 of said cam blocks, thereby locking the cam blocks to the slide 47, whereupon the movement of the slide 47 toward the left, Fig. 6, will cause said cam blocks to be moved toward the ends 74 of the guides 70 and 71. As said cam blocks approach the position just mentioned the pins 90 thereon are disconnected from the members 85 and 86 in order to permit a further movement of the slide 47. This operation is preferably accomplished by means of stops 92 secured to the guides 48 and 49 and arranged to engage beveled portions 93 at the ends of the members 85 and 86, which coöperate with said stops to disengage said pins from the notches 91 immediately prior to the engagement of the cam blocks with the ends of the slots 77.

A further movement of the members 85 and 86 relatively to the cam blocks brings said members into a position so that the pins 90 on said cam blocks will enter the notches 88 of said pivoted members, as shown in Fig. 7, and when said pins and said notches are in such relation the gripping fingers will be positioned over the receptacle 20 in readiness to dip the center held thereby. As the slide 47 starts back toward the right, Figs. 6 and 7, the members 85 and 86 move relatively to the pins 90 until said pins engage the ends 94 of their notches 88 which will then cause said cam blocks to move with said slide for a predetermined distance or until said cam blocks arrive at the ends 83 of the slots 77.

When this position is reached the members 85 and 86 are contracted so as to be disengaged from the pins 90. This contracting movement is preferably accomplished by means of beveled surfaces 95 at the free ends of the members 85 and 86, engaging the stops 92 in a similar manner to that in which the beveled surface 93 engaged said stops, thus permitting said slide to continue independent of the cam blocks 75 and 76, said movement continuing until the pins 90 enter the notches 91 of said members 85 and 86, as shown in Fig. 6, and this position is the extreme end of the movement of the slide.

The general operation of the machine hereinbefore specifically described is as follows:

The centers 96 are placed upon the endless conveyer belt 3 between guide members 97 and 98, as close together as the centers will permit, and these are fed along by the belt to the position A, shown in dotted lines, Fig. 3, which indicates the receiving station. From this station the centers are transferred, preferably one at a time, by the mechanism hereinbefore specifically described, to the position shown at 36, Fig. 3, which is the coating station.

The receptacle 20 is then elevated to dip the center and again lowered to the position shown in said figure. The transferring mechanism next moves to the right until the center carried thereby reaches a position over the tray 37 at which point the grippers are opened and the coated center drops to the surface of the tray 37, occupying the position indicated at B, Fig. 5, and after the grippers have been retracted to their starting positions in alinement with the center A the tray 37 will be advanced and the center B moved into the position indicated by the center C until said tray is filled and in readiness to be removed from the machine.

Having thus specifically described the invention what we claim and desire by Letters Patent to secure is:

1. A machine of the class described having, in combination, a coating receptacle, an agitator arranged in said receptacle, means adapted to feed centers to a position over said receptacle, and means for elevating said receptacle relatively to said agitator to dip the center thereabove.

2. In a machine of the class described a slide, means adapted to reciprocate said slide, a pair of arms pivotally mounted on said slide, coöperating gripping fingers secured to said arms, and means operated by the reciprocation of said slide adapted to open and close said fingers.

3. In a machine of the class described a slide, means adapted to reciprocate said slide, a pair of arms pivotally mounted on said slide, coöperating resilient gripping fingers secured to said arms, means for exerting a yielding pressure upon said arms to separate said fingers, and means operated by the reciprocation of said slide adapted to contract said arms.

4. In a machine of the class described a slide, means adapted to reciprocate said slide, a pair of arms pivotally mounted on said slide, coöperating resilient gripping fingers secured to said arms, a spring interposed between and adapted to normally separate said arms, and means adapted to positively contract said arms during the reciprocations of said slide.

5. In a machine of the class described a center support, a coating receptacle, resilient grippers, means for reciprocating said grippers between said center support and said coating receptacle, means adapted to operate said grippers to grip the center on said support and to maintain the grip thereon during portions of the reciprocating movements of said grippers, and means for increasing the tension of said grippers upon said center during the transferring of said center.

6. A machine of the class described having, in combination, a pair of pivotal arms, coöperating gripping fingers secured respectively to said arms, means adapted to separate said arms, means for reciprocating said arms, and guide members disposed along the path of said arms adapted to engage and contract said arms during the reciprocations thereof.

7. A machine of the class described having, in combination, a pair of arms pivotally mounted to move toward and away from each other, coöperating gripping fingers secured respectively to said arms, means adapted to separate said arms, projections on said arms, means for reciprocating said arms, and guide members disposed along the path of said arms adapted to engage said projections and contract said arms during the reciprocations thereof.

8. A machine of the class described having, in combination, coöperating gripping fingers, means for reciprocating said fingers, means for yieldingly separating said gripping fingers, and means operated by the movements of said fingers adapted to positively contract and release said fingers.

9. A machine of the class described having, in combination, a slide, a pair of arms pivotally mounted on said slide, coöperating gripping fingers secured respectively to said arms, cam blocks slidably mounted on said slide, and means on said slide adapted to automatically operate said cam blocks during the reciprocations of said slide to contract and separate said gripping fingers.

10. A machine of the class described having, in combination, a slide, means to reciprocate said slide, a pair of arms pivotally mounted on said slide to move toward and away from each other, coöperating gripping fingers secured respectively to said arms, cam blocks slidably mounted on said slide, adapted to contract said pivoted arms, pivoted members carried by said slide, adapted to engage said cam blocks during the reciprocations of said slide to move said cam blocks with said slide for a portion of the movement thereof, and stops adapted to be engaged by said pivoted members to release said members from said cam blocks.

11. A machine of the class described having, in combination, a slide, means adapted to reciprocate said slide, a pair of arms pivotally mounted on said slide, coöperating gripping fingers secured respectively to said arms, means for yieldingly separating said arms, cam blocks slidably mounted on said slide, adapted to contract said arms during the reciprocations of said slide, pivoted members mounted on said slide adapted to interlock with said cam blocks, means for yieldingly maintaining said pivoted members in interlocking engagement with said cam blocks, and stops adapted to be engaged by said pivoted members during the reciprocations of said slide to disengage said pivoted members from said cam blocks.

12. A machine of the class described having, in combination, a slide, means for reciprocating said slide, a pair of arms pivoted on said slide, coöperating gripping fingers secured respectively to said arms, means for yieldingly separating said arms, cam blocks slidably mounted on said slide, adapted to be moved relatively thereto to contact said arms and said gripping fingers, and guide members disposed along the path of said slide adapted to be engaged by said arms to maintain said arms contracted.

13. A machine of the class described having, in combination, a slide, means for reciprocating said slide, a pair of arms pivotally mounted on said slide, coöperating gripping fingers secured respectively to said arms, cam blocks slidably mounted on said slide, adapted to be operated to contract said arms, pivoted members mounted upon said slide, said pivoted members having notches adapted to interlock with said cam blocks, a spring adapted to yieldingly maintain said pivoted members in contact with said cam blocks, stationary stops adapted to be engaged by said pivoted members during the movement of said slide in one direction to disengage said pivoted members from said cam blocks, a second set of notches formed in said pivoted members adapted to interlock with said cam blocks, and means on said pivoted members adapted to engage said stops during the movement of said slide in the opposite direction to disengage said members from said cam blocks.

In testimony whereof we have hereunto set our hands in presence of two subscribing witnesses.

HENRY G. OSTERBERG.
AUGUST F. OSTERBERG.

Witnesses as to August F. Osterberg:
L. A. PIERCE,
EDGAR S. MISHER.

Copies of this patent may be obtained for five cents each, by addressing the "Commissioner of Patents, Washington, D. C."